United States Patent
Ishino

(10) Patent No.: US 9,169,375 B2
(45) Date of Patent: Oct. 27, 2015

(54) RUBBER COMPOSITION FOR TREAD, AND PNEUMATIC TIRE

(71) Applicant: SUMITOMO RUBBER INDUSTRIES, LTD., Kobe-shi, Hyogo (JP)

(72) Inventor: Soh Ishino, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 6 days.

(21) Appl. No.: 14/049,393

(22) Filed: Oct. 9, 2013

(65) Prior Publication Data
US 2014/0100317 A1    Apr. 10, 2014

(30) Foreign Application Priority Data

Oct. 10, 2012  (JP) ................. 2012-225298

(51) Int. Cl.
| | |
|---|---|
| C08K 13/02 | (2006.01) |
| C08K 3/36 | (2006.01) |
| C08K 5/40 | (2006.01) |
| C08K 5/44 | (2006.01) |
| C08K 5/47 | (2006.01) |
| C08L 9/00 | (2006.01) |
| C08L 9/06 | (2006.01) |
| C08L 21/00 | (2006.01) |
| B60C 1/00 | (2006.01) |

(52) U.S. Cl.
CPC ............. *C08K 13/02* (2013.01); *B60C 1/0016* (2013.04); *C08K 3/36* (2013.01); *C08K 5/40* (2013.01); *C08K 5/44* (2013.01); *C08K 5/47* (2013.01); *C08L 9/00* (2013.01); *C08L 9/06* (2013.01); *C08L 21/00* (2013.01); *Y02T 10/862* (2013.01)

(58) Field of Classification Search
None
See application file for complete search history.

(56) References Cited

U.S. PATENT DOCUMENTS

| | | | | |
|---|---|---|---|---|
| 3,938,574 A | * | 2/1976 | Burmester et al. | 152/209.1 |
| 5,489,627 A | * | 2/1996 | Sandstrom | 523/213 |
| 2011/0275751 A1 | * | 11/2011 | Costantini et al. | 524/432 |

FOREIGN PATENT DOCUMENTS

| | | | |
|---|---|---|---|
| JP | 4-214748 A | | 8/1992 |
| JP | 2004143249 A | * | 5/2004 |

OTHER PUBLICATIONS

JP 2004143249 A, May 2004, DERWENT Ab.*

* cited by examiner

*Primary Examiner* — Satya Sastri
(74) *Attorney, Agent, or Firm* — Birch, Stewart, Kolasch & Birch, LLP

(57) ABSTRACT

The present invention provides a rubber composition for a tread, having improved abrasion resistance, heat aging resistance, processability, and fuel economy in a balanced manner, and a pneumatic tire formed therefrom. The present invention relates to a rubber composition for a tread, comprising a rubber component, silica, a silane coupling agent, a sulfur vulcanizing agent, a sulfenamide or thiazole vulcanization accelerator 1, and a thiuram vulcanization accelerator 2.

3 Claims, No Drawings

RUBBER COMPOSITION FOR TREAD, AND PNEUMATIC TIRE

TECHNICAL FIELD

The present invention relates to a rubber composition for a tread, and a pneumatic tire formed therefrom.

BACKGROUND ART

The society has recently demanded a reduction in carbon dioxide emission for the purpose of resource conservation, energy conservation, and environmental protection. For automobiles, various measures such as weight reduction and utilization of electric energy have been examined. This requires tires for automobiles to have improved abrasion resistance for resource conservation. Also, it is desired that tires have a longer life to improve the properties such as durability.

For example, it is known that the abrasion resistance can be improved, for example, by reducing the amount of sulfur vulcanizing agent in the rubber composition. However, this method causes deterioration of fuel economy and reduction in rigidity (hardness). Thus, these properties are difficult to achieve simultaneously.

Patent Literature 1 proposes to adjust the ratio between the sulfur vulcanizing agent content and the vulcanization accelerator content so as to improve the performance of a tread in terms of heat build-up, abrasion resistance and the like. However, this method still leaves something to be desired in terms of improving the abrasion resistance, heat aging resistance, processability, and fuel economy in a balanced manner.

CITATION LIST

Patent Literature

Patent Literature 1: JP H04-214748 A

SUMMARY OF INVENTION

Technical Problem

The present invention aims to provide a rubber composition for a tread, and a pneumatic tire formed therefrom, which enable to solve the aforementioned problems and to improve the abrasion resistance, heat aging resistance, processability, and fuel economy in a balanced manner.

Solution to Problem

The present invention relates to a rubber composition for a tread, comprising a rubber component; silica; a silane coupling agent; a sulfur vulcanizing agent; a sulfenamide or thiazole vulcanization accelerator 1; and a thiuram vulcanization accelerator 2.

Preferably, the silane coupling agent comprises a silane coupling agent with a sulfur content of 15% by mass or more, and an amount (A) of the sulfur vulcanizing agent, an amount (B) of the vulcanization accelerator 1, and an amount (C) of the vulcanization accelerator 2, each per 100 parts by mass of the rubber component, satisfy the following formulas (1) to (3):

$$0.1 \leq A \leq 3.0 \tag{1},$$

$$1.0 \leq (B+C)/A \leq 60 \tag{2}, \text{ and}$$

$$1.0 \leq C/B \tag{3}.$$

Preferably, an amount of the silica is 10 to 150 parts by mass per 100 parts by mass of the rubber component, and an amount of the silane coupling agent is 1 to 20 parts by mass per 100 parts by mass of the silica.

The present invention also relates to a pneumatic tire, comprising a tread formed from the rubber composition.

Advantageous Effects of Invention

Since the rubber composition for a tread of the present invention comprises a rubber component, silica, a silane coupling agent, a sulfur vulcanizing agent, a sulfenamide or thiazole vulcanization accelerator 1, and a thiuram vulcanization accelerator 2, it makes it possible to improve the abrasion resistance, heat aging resistance, processability, and fuel economy in a balanced manner.

DESCRIPTION OF EMBODIMENTS

The rubber composition for a tread of the present invention comprises a rubber component, silica, a silane coupling agent, a sulfur vulcanizing agent, a sulfenamide or thiazole vulcanization accelerator 1, and a thiuram vulcanization accelerator 2.

The addition of a high-sulfur-content silane coupling agent to a silica-blended rubber composition tends to lead to improved fuel economy by virtue of the sulfur content, but the addition tends to decrease elongation at break, especially the elongation at break after heat aging (heat aging resistance). Meanwhile, the reduction in the amount of a sulfur vulcanizing agent within a predetermined range to give a relatively increased ratio of the vulcanization accelerator content tends to improve abrasion resistance and heat aging resistance, but the reduction tends to deteriorate fuel economy, in general. Moreover, the use of a thiuram vulcanization accelerator tends to improve rubber strength, but it tends to decrease elongation at break, especially the elongation at break after heat aging.

As mentioned above, the abrasion resistance, heat aging resistance, and fuel economy are generally difficult to achieve simultaneously. The present invention enables not only to achieve these properties simultaneously but also to achieve better processability because the present invention provides a silica-blended rubber composition which contains a silane coupling agent, a sulfur vulcanizing agent, a sulfenamide or thiazole vulcanization accelerator 1, and a thiuram vulcanization accelerator 2, and in particular contains a high-sulfur-content silane coupling agent while incorporating the sulfur vulcanizing agent, the vulcanization accelerator 1, and the vulcanization accelerator 2 such that they satisfy predetermined formulas. Therefore, the present invention enables to markedly improve the balance of abrasion resistance, heat aging resistance, fuel economy, and processability.

The rubber component is not particularly limited. Examples thereof include natural rubber (NR), isoprene rubber (IR), butadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). Preferred among these are NR, SBR, and BR, and more preferred are SBR and BR, because they can improve abrasion resistance, heat aging resistance, and fuel economy in a balanced manner.

The SBR and BR are not particularly limited, and those commonly used in the tire industry may be used. Examples of the SBR include emulsion-polymerized SBR (E-SBR) and solution-polymerized SBR (S-SBR). Examples of the BR include high-cis BR and high-trans BR. In order to achieve good properties such as good fuel economy, the SBR may suitably be one modified with a modifier (modified SBR). In order to achieve good properties such as good abrasion resistance, the BR may suitably have a cis content of 95% by mass or more.

The modified SBR may be prepared by treating SBR that is commonly used in the tire industry with a modifier. Examples of the modifier include 3-aminopropyldimethylmethoxysilane, 3-aminopropylmethyldimethoxysilane, 3-aminopropylethyldimethoxysilane, 3-aminopropyltrimethoxysilane, 3-(2-aminoethylamino)propyltrimethoxysilane, tin tetrachloride, butyltin trichloride, and N-methylpyrrolidone. These may be used alone, or two or more of these may be used in combination. Among these, N-methylpyrrolidone is preferred because it allows the effects of the present invention to be favorably obtained.

Examples of the method for modifying SBR with a modifier include conventionally known methods such as those described in JP H06-53768 B, JP H06-57767 B, and JP 2003-514078T. For example, contact between SBR and a modifier is enough to modify SBR with the modifier. Examples of such methods include a method in which SBR is synthesized by anion polymerization, and then the polymerized rubber solution is mixed with a predetermined amount of a modifier so that the polymerization end (active end) of SBR is reacted with the modifier, and a method in which a modifier is added to an SBR solution to cause the reaction therebetween.

The amount of SBR, based on 100% by mass of the rubber component, is preferably 30% by mass or more, more preferably 50% by mass or more, and still more preferably 60% by mass or more. The SBR in an amount of less than 30% by mass may fail to provide good fuel economy. The amount of SBR is preferably 90% by mass or less, and more preferably 85% by mass or less. The SBR in an amount of more than 90% by mass may not lead to sufficient abrasion resistance.

The amount of BR, based on 100% by mass of the rubber component, is preferably 5% by mass or more, and more preferably 15% by mass or more. The BR in an amount of less than 5% by mass may fail to provide sufficient fuel economy and abrasion resistance. The amount of BR is preferably 70% by mass or less, more preferably 60% by mass or less, and still more preferably 45% by mass or less. The BR in an amount of more than 70% by mass may not lead to good fuel economy.

In order to achieve good balance of abrasion resistance, heat aging resistance, fuel economy, and processability, the combined amount of SBR and BR, based on 100% by mass of the rubber component, is preferably 80% by mass or more, and more preferably 90% by mass or more. The combined amount may be 100% by mass.

The silica may be dry silica (anhydrous silica) or wet silica (hydrous silica), for example. Preferred is wet silica because it has many silanol groups. These silicas may be used alone, or two or more of these may be used in combination.

The silica preferably has a nitrogen adsorption specific surface area ($N_2SA$) of 30 $m^2/g$ or greater, more preferably 100 $m^2/g$ or greater, whereas it preferably has an $N_2SA$ of 300 $m^2/g$ or smaller, more preferably 280 $m^2/g$ or smaller. The silica having an $N_2SA$ in that range enables to provide fuel economy and processability in a balanced manner. The $N_2SA$ of silica is a value measured by the BET method in accordance with ASTM D3037-81.

The amount of silica, per 100 parts by mass of the rubber component, is preferably 10 parts by mass or more, more preferably 40 parts by mass or more, and still more preferably 60 parts by mass or more. The silica in an amount of less than 10 parts by mass may fail to provide sufficient fuel economy. The amount thereof is preferably 150 parts by mass or less, more preferably 120 parts by mass or less, and still more preferably 100 parts by mass or less. The silica in an amount of more than 150 parts by mass may be difficult to uniformly disperse in the rubber composition, which may cause the rubber composition to have not only poor processability but also increased rolling resistance.

The silane coupling agent used in the present invention may suitably be a silane coupling agent having a sulfur content of 15% by mass or more based on 100% by mass of the silane coupling agent. The silane coupling agent with a sulfur content of less than 15% by mass may lead to a decrease in abrasion resistance, fuel economy, and processability, thereby decreasing the balance of the properties. The sulfur content is preferably 20% by mass or more. The upper limit of the sulfur content is not particularly limited, and it is preferably 70% by mass or less, and more preferably 50% by mass or less.

Specific examples of the silane coupling agent include: sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl) disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. Preferred among these compounds are sulfide silane coupling agents with a sulfur content of 15% by mass or more, more preferred are bis(3-triethoxysilylpropyl)tetrasulfide, bis(2-triethoxysilylethyl)tetrasulfide, bis(3-trimethoxysilylpropyl) tetrasulfide, and bis(2-trimethoxysilylethyl)tetrasulfide, and particularly preferred is bis(3-triethoxysilylpropyl)tetrasulfide, because they enable to improve fuel economy to improve the balance of the properties. These may be used alone, or two or more of these may be used in combination.

The amount of the silane coupling agent, per 100 parts by mass of silica, is preferably 1 part by mass or more, and more preferably 2 parts by mass or more. The amount thereof is preferably 20 parts by mass or less, and more preferably 15 parts by mass or less. The silane coupling agent in an amount of less than 1 part by mass may fail to exert its effects and may thereby not have an effect sufficient to improve the balance of the properties. The silane coupling agent in an amount of more than 20 parts by mass tends to fail to produce an effect proportional to the increase in the amount and thereby tends to lead to high cost, as well as possibly leading to a decrease in the properties such as abrasion resistance.

The rubber composition of the present invention preferably contains, in addition to silica, carbon black as a reinforcing filler. The carbon black to be used is not particularly limited, and examples thereof include those commonly used in the tire industry, such as GPF, FEF, HAF, ISAF, and SAF. These may be used alone, or two or more of these may be used in combination.

The carbon black preferably has a nitrogen adsorption specific surface area ($N_2SA$) of 80 $m^2/g$ or greater, more preferably 110 $m^2/g$ or greater, whereas it preferably has an $N_2SA$ of 200 $m^2/g$ or smaller, more preferably 150 $m^2/g$ or smaller. The carbon black also preferably has a dibutyl phthalate (DBP) oil absorption of 80 ml/100 g or more, more preferably 110 ml/100 g or more, whereas it preferably has a DBP oil absorption of 180 ml/100 g or less, more preferably 140 ml/100 g or less. If each of these parameters is below the corresponding lower limit, the carbon black may fail to give sufficient reinforcement. If each of the parameters exceeds the corresponding upper limit, the rubber composition tends to have poor processability. The $N_2SA$ and the DBP oil absorption of carbon black are measured in accordance with JIS K6217-2:2001 and JIS K6217-4:2001, respectively.

In the case of adding carbon black, the amount of carbon black, per 100 parts by mass of the rubber component, is preferably 1 part by mass or more, and more preferably 3 parts by mass or more, whereas it is preferably 30 parts by mass or less, and more preferably 10 parts by mass or less. The addition of carbon black in an amount in that range in addition to silica enables to markedly improve the balance of the properties.

The combined amount of silica and carbon black, per 100 parts by mass of the rubber component, is preferably 10 parts by mass or more, and more preferably 40 parts by mass or more. The combined amount of less than 10 parts by mass may fail to give sufficient reinforcement and may thereby not allow the effects of the present invention to be obtained. The combined amount thereof is preferably 150 parts by mass or less, and more preferably 120 parts by mass or less. The combined amount of more than 150 parts by mass may not lead to sufficient fuel economy and process ability.

In the rubber composition of the present invention, the silica content, based on 100% by mass of a total of silica and carbon black, is preferably 70% by mass or more, more preferably 80% by mass or more, and still more preferably 90% by mass or more. If the silica content is less than 70% by mass, then the properties may not be improved in a balanced manner. The upper limit of the silica content is not particularly limited, and it may be 100% by mass, preferably 98% by mass or less.

The rubber composition of the present invention contains a sulfur vulcanizing agent as a cross-linking agent.

Examples of the sulfur vulcanizing agent to be used include those conventionally known in the field of rubber, such as sulfur powder, precipitated sulfur, colloidal sulfur, insoluble sulfur, and highly dispersible sulfur.

The amount (A) of the sulfur vulcanizing agent, per 100 parts by mass of the rubber component, preferably satisfies the following formula (1):

$$0.1 \leq A \leq 3.0 \qquad (1).$$

The sulfur vulcanizing agent in an amount of less than 0.1 parts by mass may provide too little cross-linking, leading to lowered rubber physical properties and therefore reduced properties such as decreased abrasion resistance. The sulfur vulcanizing agent in an amount of more than 3.0 parts by mass may cause reduction in abrasion resistance and heat aging resistance. The lower limit of the amount (A) is preferably 0.3 parts by mass or more, and more preferably 0.5 parts by mass or more. The upper limit of the amount (A) is preferably 2.5 parts by mass or less, and more preferably 2.2 parts by mass or less.

The rubber composition of the present invention contains a sulfenamide or thiazole vulcanization accelerator (vulcanization accelerator 1) and a thiuram vulcanization accelerator (vulcanization accelerator 2). The addition of these vulcanization accelerators and sulfur and the subsequent vulcanization of the mixture enable the resulting rubber composition to have excellent balance of abrasion resistance, heat aging resistance, and fuel economy. In particular, it is preferred to use a sulfenamide vulcanization accelerator and a thiuram vulcanization accelerator in combination.

Examples of the sulfenamide vulcanization accelerator as the vulcanization accelerator 1 include N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and N,N-diisopropyl-2-benzothiazolesulfenamide. Preferred among these are TBBS and CBS, and more preferred is TBBS, because they can lead to an appropriate scorch time and proper curing rate and can also provide a rubber composition having well-balanced abrasion resistance, heat aging resistance, and fuel economy.

Examples of the thiazole vulcanization accelerator as the vulcanization accelerator 1 include 2-mercaptobenzothiazole (MBT), dibenzothiazyldisulfide (MBTS), sodium, zinc, copper, or cyclohexylamine salts of 2-mercaptobenzothiazole, 2-(2,4-dinitrophenyl)mercaptobenzothiazole, and 2-(2,6-diethyl-4-morpholinothio)benzothiazole. Preferred among these are MBT and MBTS, and particularly preferred is MBTS, because they not only tend to cause less scorch but also can provide a rubber composition having well-balanced abrasion resistance, heat aging resistance, and fuel economy.

Examples of the thiuram vulcanization accelerator as the vulcanization accelerator 2 include tetrabenzylthiuramdisulfide (TBzTD), tetrakis(2-ethylhexyl)thiuramdisulfide (TOT-N), tetramethylthiuramdisulfide, tetraethylthiuramdisulfide, tetrabutylthiuramdisulfide, dipentamethylenethiuramdisulfide, tetrahexylthiuramdisulfide, tetramethylthiurammonosulfide, dipentamethylenethiurammonosulfide, dipentamethylenethiuramtetrasulfide, and dipentamethylenethiuramhexasulfide. Preferred among these are TBzTD and TOT-N, and particularly preferred is TBzTD, because they can improve cross-linking efficiency and can also provide a rubber composition having well-balanced abrasion resistance, heat aging resistance, and fuel economy.

The amount of the sulfenamide or thiazole vulcanization accelerator, that is, the amount (B) of the vulcanization accelerator 1, per 100 parts by mass of the rubber component, is preferably 0.05 parts by mass or more, more preferably 0.3 parts by mass or more, and still more preferably 0.5 parts by mass or more. The vulcanization accelerator 1 in an amount of less than 0.05 parts by mass may fail to give sufficient hardness and may thereby lead to a poor balance of abrasion resistance, heat aging resistance, and fuel economy. The amount (B) is preferably 3.0 parts by mass or less, more preferably 2.0 parts by mass or less, and still more preferably 1.5 parts by mass or less. The vulcanization accelerator 1 in an amount of more than 3.0 parts by mass may lead to a too short scorch time, causing compound scorch.

The amount of the thiuram vulcanization accelerator, that is, the amount (C) of the vulcanization accelerator 2, per 100 parts by mass of the rubber component, is preferably 1.0 part by mass or more, more preferably 1.5 parts by mass or more, and still more preferably 1.8 parts by mass or more. The vulcanization accelerator 2 in an amount of less than 1.0 part by mass may fail to give the effects of improving scorch resistance and cross-linking efficiency and may thereby lead to a poor balance of abrasion resistance, heat aging resistance, and fuel economy. The amount (C) is preferably 5.0 parts by mass or less, more preferably 4.0 parts by mass or less, and still more preferably 3.5 parts by mass or less. The vulcanization accelerator 2 in an amount of more than 5.0 parts by mass may lead to a too short scorch time.

The combined amount of the vulcanization accelerators 1 and 2 (namely, the amount (B+C)), per 100 parts by mass of the rubber component, is preferably 1.0 part by mass or more, and more preferably 1.5 parts by mass or more. The vulcanization accelerators 1 and 2 in a combined amount of less than 1.0 part by mass may provide too little cross-linking leading to deteriorated rubber physical properties. The amount (B+C) is preferably 10.0 parts by mass or less, more preferably 8.0 parts by mass or less, and still more preferably 7.0 parts by mass or less. The vulcanization accelerators 1 and 2 in a combined amount of more than 10.0 parts by mass tend to cause reduction in rubber strength.

The amount (A) of the sulfur vulcanizing agent, the amount (B) of the vulcanization accelerator 1, and the amount (C) of the vulcanization accelerator 2, each per 100 parts by mass of the rubber component, preferably satisfy the following formulas (2) and (3):

$$1.0 \leq (B+C)/A \leq 60 \quad (2), \text{ and}$$

$$1.0 \leq C/B \quad (3).$$

The components satisfying the above formulas enable to markedly improve the balance of abrasion resistance, heat aging resistance, fuel economy, and processability.

If the lower limit of the (B+C)/A ratio, that is, the ratio of (combined amount of vulcanization accelerators 1 and 2)/(amount of sulfur vulcanizing agent) in formula (2) is lower than 1.0, then the abrasion resistance and heat aging resistance may be reduced. If the upper limit thereof is higher than 60, then the abrasion resistance may be reduced. The lower limit is preferably 2.0 or higher, and more preferably 3.0 or higher, whereas the upper limit is preferably 30 or lower, and more preferably 20 or lower.

If the lower limit of the (C/B) ratio, that is, the ratio of (amount of vulcanization accelerator 2)/(amount of vulcanization accelerator 1) in formula (3) is lower than 1.0, then the abrasion resistance, heat aging resistance, fuel economy, and processability may be reduced, leading to a poor balance of the properties. The lower limit thereof is preferably 2.0 or higher, and more preferably 2.5 or higher. The upper limit thereof is not particularly limited, and is preferably 30 or lower, more preferably 20 or lower, and still more preferably 15 or lower.

The rubber composition of the present invention may contain another vulcanization accelerator such as a guanidine vulcanization accelerator, in addition to the vulcanization accelerators 1 and 2. Examples of the guanidine vulcanization accelerator include N,N'-diphenylguanidine, di-ortho-tolylguanidine, triphenylguanidine, ortho-tolylbiguanide, and diphenylguanidine phthalate. Preferred among these are diphenylguanidine vulcanization accelerators such as N,N'-diphenylguanidine, and particularly preferred is N,N'-diphenylguanidine (1,3-diphenylguanidine), because they can lead to a favorable curing rate and can also provide a rubber composition having well-balanced abrasion resistance, heat aging resistance, and fuel economy.

The amount of the guanidine vulcanization accelerator, per 100 parts by mass of the rubber component, is preferably 0.5 parts by mass or more, and more preferably 1.0 part by mass or more. The guanidine vulcanization accelerator in an amount of less than 0.5 parts by mass may fail to give a good curing start time and may thereby not lead to desired rubber physical properties. The amount thereof is preferably 4.0 parts by mass or less, and more preferably 2.5 parts by mass or less. The guanidine vulcanization accelerator in an amount of more than 4.0 parts by mass may cause scorching during the processing.

In addition to the aforementioned components, the rubber composition of the present invention may appropriately contain various other materials commonly used in the tire industry, such as oil, stearic acid, zinc oxide, antioxidants, plasticizers, lubricants, and wax.

The rubber composition of the present invention may be prepared by any known method. Examples of the method include a method in which the components are kneaded using a rubber kneading machine such as an open roll mill or a Banbury mixer, and then the mixture is vulcanized (cross-linked).

The rubber composition of the present invention can be suitably used for preparing a tread.

The pneumatic tire of the present invention can be produced by a usual method using the rubber composition prepared by, for example, the above method. Specifically, the rubber composition, before vulcanization, is first extruded and processed into the shape of a tread, and then arranged by a usual method in a tire building machine and assembled with other tire components to prepare an unvulcanized tire. Then, the unvulcanized tire is heated and pressurized in a vulcanizer to produce a tire.

The pneumatic tire of the present invention can be suitably used as a tire for passenger cars.

EXAMPLES

The present invention will be described in detail below, referring to, but not limited to, examples.

The following will collectively describe the chemicals used in the examples and comparative examples.

SBR: NS116R (ZEON CORP., S-SBR one end of which is modified with N-methylpyrrolidone, styrene content: 22% by mass, vinyl bond content: 65% by mass)

BR: UBEPOL BR150B (UBE INDUSTRIES, LTD.)

Silica: ULTRASIL VN3 (Degussa, $N_2SA$: 175 $m^2/g$)

Silane coupling agent 1: Si69 (Evonik Degussa, bis(3-triethoxysilylpropyl)tetrasulfide, sulfur content: 22.5% by mass)

Silane coupling agent 2: Si266 (Evonik Degussa, bis(3-triethoxysilylpropyl)disulfide, sulfur content: 14.4% by mass)

Oil: X-140 (Japan Energy Corp.)

Antioxidant: NOCRAC 6C (OUCHI SHINKO CHEMICAL INDUSTRIAL CO., LTD., N-(1,3-dimethylbutyl)-N'-phenyl-p-phenylenediamine)

Stearic acid: Stearic Acid "Tsubaki" (NOF CORP.)

Zinc oxide: Zinc oxide #1 (MITSUI MINING & SMELTING CO., LTD.)

Wax: SUNNOC N (OUCHI SHINKO CHEMICAL INDUSTRIAL CO., LTD.)

Sulfur vulcanizing agent: SULFUR POWDER (TSURUMI CHEMICAL INDUSTRY CO., LTD., sulfur content: 100% by mass)

Vulcanization accelerator 1: Sanceler NS (SANSHIN CHEMICAL INDUSTRY CO., LTD., N-tert-butylbenzothiazyl-2-sulfenamide)

Vulcanization accelerator 2: Sanceler TBzTD (SANSHIN CHEMICAL INDUSTRY CO., LTD., tetrabenzylthiuramdisulfide)

Vulcanization accelerator 3: Sanceler D-G (SANSHIN CHEMICAL INDUSTRY CO., LTD., N,N'-diphenylguanidine)

Examples and Comparative Examples

The materials in amounts shown in Table 1, except the sulfur and vulcanization accelerators, were kneaded for five minutes at 150° C. using a 1.7-L Banbury mixer (KOBE STEEL, LTD.), thereby providing a kneaded mixture. The sulfur and vulcanization accelerators were added to the kneaded mixture, and the resulting mixture was kneaded for three minutes at 80° C. using an open roll mill to yield an unvulcanized rubber composition. The obtained unvulcanized rubber composition was press-vulcanized at 170° C. for 20 minutes, thereby providing a vulcanized rubber composition.

The unvulcanized rubber compositions and vulcanized rubber compositions obtained as above were evaluated as follows. Table 1 shows the results.

Index of Processability

Mooney Viscosity

The Mooney viscosity of the unvulcanized rubber composition was measured at 130° C. in accordance with JIS K6300. The measured value was expressed as an index (index of processability) relative to the Mooney viscosity ($ML_{4+4}$) in Comparative Example 1 (=100), according to the following formula. The greater the index is, the lower the Mooney viscosity is, and in turn, the better the processability is.

(Index of processability)=($ML_{1+4}$ in Comparative Example 1)/($ML_{1+4}$ in each example)×100

Index of Fuel Economy

A sample with a predetermined size was cut out of the vulcanized rubber composition. The loss tangent (tan δ) of the vulcanized rubber sheet was measured at an initial strain of 10%, a dynamic strain of 2%, a frequency of 10 Hz, and a temperature of 60° C. using a viscoelasticity spectrometer (Ueshima Seisakusho Co., Ltd.). The measured value was expressed as an index (index of fuel economy) relative to the tan δ in Comparative Example 1 (=100), according to the following formula. The greater the index is, the better the fuel economy is.

(Index of fuel economy)=(tan δ in Comparative Example 1)/(tan δ in each example)×100

Index of Heat Aging Resistance

Retention

A fresh vulcanized rubber composition was subjected to a tensile test in accordance with JIS K6251:2010 to measure the elongation at break. The tensile test was also performed after heat aging (100° C., 96 hours) in accordance with JIS K6257:2010, to measure the elongation at break after heat aging. Then, the retention of the elongation at break (index of heat aging resistance) was calculated based on the following formula. The greater the index is, the better the heat aging resistance is.

(Index of heat aging resistance)=(elongation at break after heat aging)/(elongation at break of fresh sample)×100

Index of Abrasion Resistance

The amount of abrasion of the vulcanized rubber composition was measured at room temperature, a load of 1.0 kgf, and a slip ratio of 30% using a Lambourn abrasion tester. The measured value was expressed as an index relative to the inverse of the amount of abrasion in Comparative Example 1 (=100). The greater the index is, the higher the abrasion resistance is.

TABLE 1

|  |  | Comparative Example |  |  |  |  |  |  |  |  | Example |  |  |  |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| Composition (part(s) by mass) | SBR (NS116R) | 75 | 75 | 75 | 75 | 75 | 75 | 75 | 75 | 75 | 75 | 75 | 75 | 75 |
|  | BR (BR150B) | 25 | 25 | 25 | 25 | 25 | 25 | 25 | 25 | 25 | 25 | 25 | 25 | 25 |
|  | Silica | 80 | 80 | 80 | 80 | 80 | 80 | 80 | 80 | 80 | 80 | 80 | 80 | 80 |
|  | Silane coupling agent 1 (Si69) | 6.4 | 6.4 | 6.4 | 6.4 | 6.4 | — | — | — | — | 6.4 | 6.4 | 6.4 | 6.4 |
|  | Silane coupling agent 2 (Si266) | — | — | — | — | — | 6.4 | 6.4 | 6.4 | 6.4 | — | — | — | — |
|  | Oil | 20 | 20 | 20 | 20 | 20 | 20 | 20 | 20 | 20 | 20 | 20 | 20 | 20 |
|  | Antioxidant | 2.5 | 2.5 | 2.5 | 2.5 | 2.5 | 2.5 | 2.5 | 2.5 | 2.5 | 2.5 | 2.5 | 2.5 | 2.5 |
|  | Stearic acid | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 |
|  | Sulfur vulcanizing agent | 2 | 2 | 0.1 | 0.09 | 3.05 | 0.3 | 0.5 | 1 | 2 | 0.3 | 0.5 | 1 | 2 |
|  | Vulcanization accelerator 1 (sulfenamide) | 2 | 0.5 | 1.5 | 0.2 | 1.05 | 1 | 1 | 0.5 | 0.1 | 1 | 1 | 0.5 | 0.1 |
|  | Vulcanization accelerator 2 (thiuram) | 0.3 | 1 | 6 | 5 | 2 | 4 | 2 | 3 | 2 | 4 | 2 | 3 | 2 |
|  | Vulcanization accelerator 3 (guanidine) | 2 | 2 | 2 | 2 | 2 | 2 | 2 | 2 | 2 | 2 | 2 | 2 | 2 |
| Formula (2) | (B + C)/A [(amount of accelerator 1) + (amount of accelerator 2)]/ (amount of sulfur vulcanizing agent) | 1.2 | 0.8 | 75.0 | 57.8 | 1.0 | 16.7 | 6.0 | 3.5 | 1.1 | 16.7 | 6.0 | 3.5 | 1.1 |

TABLE 1-continued

|  |  | Comparative Example | | | | | | | | | Example | | | |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| Formula (3) | C/B (amount of accelerator 2)/ (amount of accelerator 1) | 0.2 | 2.0 | 4.0 | 25.0 | 1.9 | 4.0 | 2.0 | 6.0 | 20.0 | 4.0 | 2.0 | 6.0 | 20.0 |
| Combined amount of accelerators 1 and 2 (amount of accelerator 1) + (amount of accelerator 2) | | 2.3 | 1.5 | 7.5 | 5.2 | 3.05 | 5 | 3 | 3.5 | 2.1 | 5 | 3 | 3.5 | 2.1 |
| Evaluation | Index of processibility | 100 | 102 | 105 | 105 | 110 | 93 | 95 | 100 | 105 | 103 | 105 | 110 | 115 |
|  | Index of fuel economy | 100 | 90 | 95 | 90 | 75 | 95 | 90 | 85 | 78 | 120 | 115 | 110 | 103 |
|  | Index of heat aging resistance | 70 | 65 | 85 | 80 | 60 | 85 | 83 | 80 | 75 | 90 | 88 | 85 | 80 |
|  | Index of abrasion resistance | 100 | 102 | 110 | 110 | 120 | 88 | 90 | 93 | 95 | 103 | 105 | 108 | 110 |

Table 1 shows that silica-blended rubber compositions, which contained a high-sulfur-content silane coupling agent and also contained a sulfur vulcanizing agent, a sulfenamide vulcanization accelerator, and a thiuram vulcanization accelerator such that they satisfied predetermined formulas, were able to markedly improve the balance of the properties, that is, abrasion resistance, heat aging resistance, fuel economy, and processability.

The invention claimed is:

1. A pneumatic tire, comprising
    a tread formed from a rubber composition for a tread, comprising:
    a rubber component;
    silica;
    a silane coupling agent;
    a sulfur vulcanizing agent;
    a sulfenamide or thiazole vulcanization accelerator 1; and
    a thiuram vulcanization accelerator 2,
wherein the silane coupling agent comprises a silane coupling agent with a sulfur content of 15% by mass or more, and an amount (A) of the sulfur vulcanizing agent, an amount (B) of the vulcanization accelerator 1, and an amount (C) of the vulcanization accelerator 2, each per 100 parts by mass of the rubber component, satisfy the following formulas (1) and (3):

$$0.1 \leq A \leq 3.0 \tag{1},$$

$$1.0 \leq (B+C)/A \leq 16.7 \tag{2}, \text{ and}$$

$$2.0 \leq C/B \leq 20 \tag{3}.$$

2. The pneumatic tire according to claim 1,
wherein an amount of the silica is 10 to 150 parts by mass per 100 parts by mass of the rubber component, and
an amount of the silane coupling agent is 1 to 20 parts by mass per 100 parts by mass of the silica.

3. The pneumatic tire of claim 1, wherein the silane coupling agent has a sulfur content of 15% by mass to 70% by mass based on 100% by mass of the silane coupling agent.

* * * * *